United States Patent
Keohane et al.

(10) Patent No.: US 7,974,286 B2
(45) Date of Patent: Jul. 5, 2011

(54) REDUCED REDUNDANT SECURITY SCREENING

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/566,249

(22) Filed: Dec. 4, 2006

(65) Prior Publication Data

US 2008/0134332 A1    Jun. 5, 2008

(51) Int. Cl.
*H04L 12/56* (2006.01)

(52) U.S. Cl. ............. 370/392; 370/395.3; 370/401; 709/223; 713/201

(58) Field of Classification Search .......... 370/389, 370/392, 393; 709/223; 713/201
See application file for complete search history.

(56) References Cited

U.S. PATENT DOCUMENTS

| 6,714,970 | B1 | 3/2004 | Fiveash et al. |
| 6,789,200 | B1 | 9/2004 | Fiveash et al. |
| 6,981,143 | B2 | 12/2005 | Mullen et al. |
| 7,392,323 | B2 * | 6/2008 | Yim et al. ............ 709/236 |
| 2003/0088662 | A1 | 5/2003 | Okamoto |
| 2003/0229703 | A1 | 12/2003 | Falola et al. |
| 2005/0021956 | A1 | 1/2005 | Genty et al. |
| 2005/0240777 | A1 | 10/2005 | Keohane et al. |
| 2005/0257263 | A1 | 11/2005 | Keohane et al. |
| 2005/0276230 | A1 * | 12/2005 | Akahane et al. ......... 370/252 |

FOREIGN PATENT DOCUMENTS

| WO | 9963727 | 12/1999 |
| WO | 2005112317 A2 | 11/2005 |

OTHER PUBLICATIONS

U.S. Appl. No. 11/260,609, filed Oct. 27, 2005, Genty et al.
Cromer et al., "Reporting Encryption Errors to a management Server", IBM Research Disclosure Bulletin vol. 42, No. 419, Article 41994, Mar. 1999, pp. 1-2.

* cited by examiner

*Primary Examiner* — Jayanti K Patel
*Assistant Examiner* — Bo Hui A. Zhu
(74) *Attorney, Agent, or Firm* — Yee & Associates, P.C.; Justin M. Dillon

(57) ABSTRACT

A computer implemented method, apparatus, and computer usable program code for screening data packets. A determination is made as to whether a signature of a trusted security element is present in a header of the data packet in response to receiving a data packet. The signature indicates that a previous security action has been performed on the data packet. A security action is performed on the data packet based on the previous security action performed on the data packet in response to the signature of the trusted security element being present.

7 Claims, 3 Drawing Sheets

REDUCED REDUNDANT SECURITY SCREENING

BACKGROUND OF THE INVENTION

1. Field of the Invention

The present invention relates generally to an improved data processing system and in particular to a method and apparatus for processing. Still more particularly, the present invention relates to a computer implemented method, apparatus, and computer usable program code for performing security actions on data packets.

2. Description of the Related Art

Malware software is designed to infiltrate or damage a computer system. Malware includes computer viruses, worms, Trojan horses, spyware, adware, and other malicious and unwanted software. This type of software also is referred to as a computer contaminant. Programs and devices have been developed to prevent and reduce the spread of malware. Network security for many businesses is set up in multiple layers.

In today's computing environment, using a firewall at an Internet access point is no longer adequate to protect a network. A firewall is a security device that is configured to permit, deny, or proxy data connections set and configured through a security policy. Firewalls may be either hardware and/or software based. Virus scanners are also implemented at mail components, such as gateways and mail servers. Even laptops and personal computers include virus scanning software. Additionally, even firewalls and internal secure routers often include pattern matching virus scanning capabilities.

In addition to virus scanners, other software to locate and remove other malware such as spyware and Trojan horses are also employed at these types of security devices. These multiple levels of security are inefficient because the same data may be scanned multiple times for the same type of malware. Coordinating the scanning or performance of security actions is difficult given the complexity of network security.

For example, a laptop in a network may be configured to trust incoming mail with knowledge that the mail server runs a virus scan on all e-mail. However, another internal computer may be infected with a virus and send an e-mail message to the laptop, bypassing the mail server. The safest action is to scan all incoming e-mail messages to avoid the situation in which a direct e-mail may contain a virus or other malware.

Further, a data packet may enter through a firewall, which determines whether the origin of the data packet is trusted. This data packet may then travel to a mail gateway, which performs a virus scan. Thereafter, the data packet is transferred onto a host computer, which runs another virus scan on the data packet.

This type of redundancy is inefficient given the cost for scanning data packets. The amount of time and processor resources needed to scan all incoming data packets is costly in terms of performance and time. These layers of security, however, are still needed because any infected computing device such as a laptop, may be brought into an organization and connected to the network, which may attack the host computer directly.

Therefore, it would be advantageous to have a computer implemented method, apparatus, and computer usable program code for efficiently performing security actions on data packets.

SUMMARY OF THE INVENTION

The illustrative embodiments provide a computer implemented method, apparatus, and computer usable program code for screening data packets. A determination is made as to whether a signature of a trusted security element is present in a header of the data packet in response to receiving a data packet. The signature indicates that a previous security action has been performed on the data packet. A security action is performed on the data packet based on the previous security action performed on the data packet in response to the signature of the trusted security element being present.

The data packet is processed after performing the security action. Another signature is added to the data packet in response to performing the security action on the data packet. The security action may be an absence of an additional action to check the data packet. The security action also may be a virus scan. The security action is selected based on the identified previous security action performed on the data packet and the security action is then performed on the data packet. The trusted security element may be a network firewall. In these illustrative examples, the signature is located in a header of the data packet. The header is part of chain of headers between a base header and a payload in the data packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
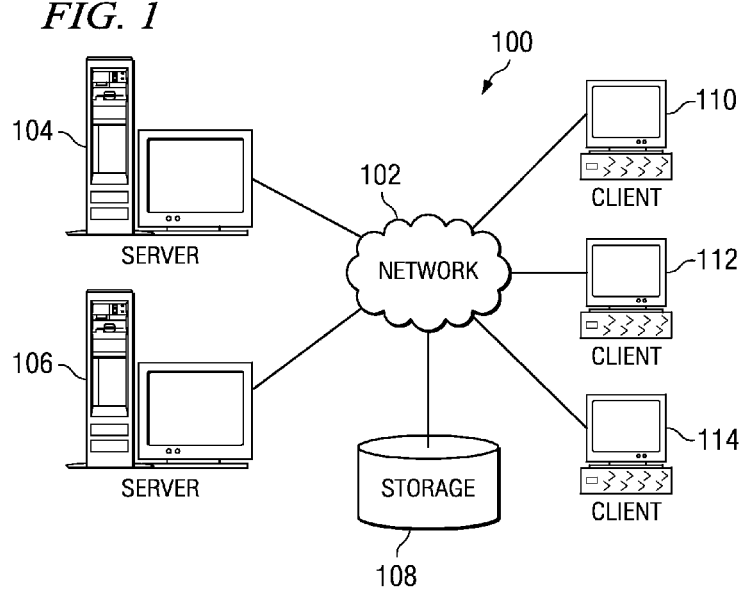
FIG. 1 is a pictorial representation of a network of data processing systems in which illustrative embodiments may be implemented.
Figure 2:
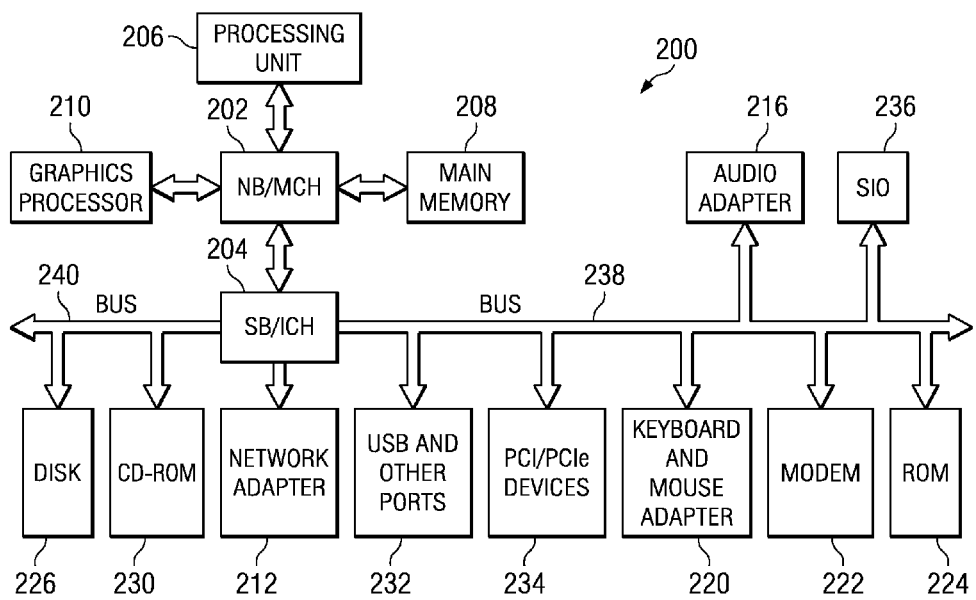
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. These clients and servers may include software and/or hardware used to perform security actions to remove malware from data packets received by them. Further, network 102 also includes devices such as routers, gateways, and firewalls that may have software/hardware to perform security actions with respect to malware. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments provide a computer implemented method, apparatus, and computer usable program code for screening or processing data packets. In particular, the different embodiments may be applied to a network that has multiple layers of security. This network may be a network, such as network 102 in FIG. 1. The network may take various forms, such as, for example, a virtual private network encompassing the Internet and other networks, an intranet, or a local area network. When a data packet is received, a determination is made as to whether a signature of a trusted security element is present in the header of the data packet. This signature indicates that a previous security action has been performed on the data packet. In response to the signature of a security element being present, a security action is selectively performed on the data packet based on the previous security action. This security action may include performing another scan on the data packet, a different type of scan, or no action at all.

Figure 3:
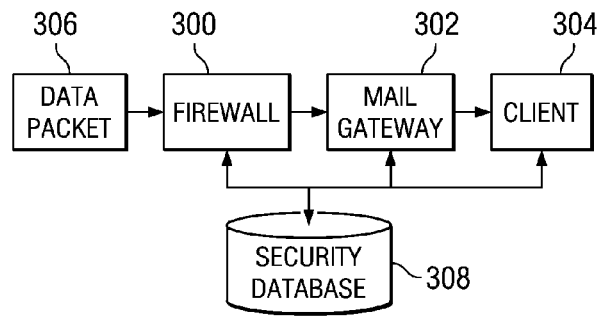
FIG. 3 is a diagram illustrating a multiple level security system in a network in accordance with an illustrative embodiment.

Turning now to FIG. 3, a diagram illustrating a multiple level security system in a network is depicted in accordance with an illustrative embodiment. In these illustrative examples, firewall 300, mail gateway 302, and client 304 form different levels of network security in a network. Data packet 306 is received by firewall 300. Firewall 300 performs a security action that includes determining whether a data packet originates from a trusted source. A security action is an action taken on a data packet in an effort to prevent the introduction of malware. The security action may take various forms. For example, security action may be the determination of whether the data packet is from a trusted source. The security action also may be the performing of a scan for viruses, worms, Trojan horses, adware, and/or other malicious and other unwanted software. The security action also may include taking no action depending on the prior actions taken on a particular data packet.

If data packet 306 is determined to be from a trusted source, firewall 300 allows data packet 306 to be passed to mail gateway 302. Before passing data packet 306 to mail gateway 302, firewall 300 adds a signature to data packet 306. In these examples, the signature is a digital signature added to the header of data packet 306. This signature indicates that a security action has been performed on data packet 306. In this case, the security action indicates that data packet 306 has originated from a trusted source.

When data packet 306 is received by mail gateway 302, mail gateway 302 examines data packet 306 to determine whether a signature from a trusted security element is present in data packet 306. In these examples, a trusted security element is a network element, such as a firewall, mail gateway, router, or some other security intermediary that performs a security action on a data packet.

In this example, a signature added by firewall 300 is present. Mail gateway 302 then performs a virus scan on data packet 306. Although, firewall 300 allowed data packet 306 to pass, this security element did not perform any scanning for malware. As a result, mail gateway 302 performs another security action to scan for viruses. Thereafter, mail gateway 302 adds a signature to data packet 306.

Then, data packet 306 is passed to client 304. Client 304 examines data packet 306 for signatures from trusted security elements. In this case, two signatures are found. These signatures indicate that the data packet is from a trusted source and that no viruses were found in data packet 306. Client 304 then performs an additional security action based on the security actions already performed. Client 304 scans data packet 306 for spyware. This security action is performed because the other scans did not include scanning data packet 306 for this type of malware. Client 304, however, does not need to perform a virus scan in this example because this type of security action has already been performed by mail gateway 302. In this manner, the amount of time and resources used in scanning data packet 306 is reduced. Unneeded redundancy does not occur, saving time in processing data. If mail gateway 302 had performed both virus and anti-spyware scans on data packet 306, client 304 would taken no action as the security action in these examples.

In these examples, the determination of what security actions have been taken may be identified by a code in the signature. For example, a code of "01" or "policy 1" may indicate that the source of the data packet is a trusted source. A code of "02" or "policy 2" may indicate that a virus scan has been performed by the trusted element. The codes may also indicate particular types of scanning mechanisms that were used to scan the data packet. These codes may be located at firewall 300, mail gateway 302, and client 304.

Alternatively, these components may consult a database, such as security database 308 to identify current codes. Further, the identification of the security element may be used to determine what security action has been performed.

In this manner, other recipients of data packet 306 may identify what security actions have been performed on data packet 306 to determine what additional security actions are to be performed. In some cases, the security action is that no further action is to be taken because all of the necessary scans have been performed on data packet 306. The identification of these scans are found in a header of data packet 306 in these particular examples. More specifically, the different illustrative embodiments may be implemented in a data packet using Internet protocol version 6 (IPv6). This protocol is a network layer Internet protocol standard used to exchange data across a packet switched network. In this type of protocol, data packets include a multi-header chain followed by the payload.

Figure 4:
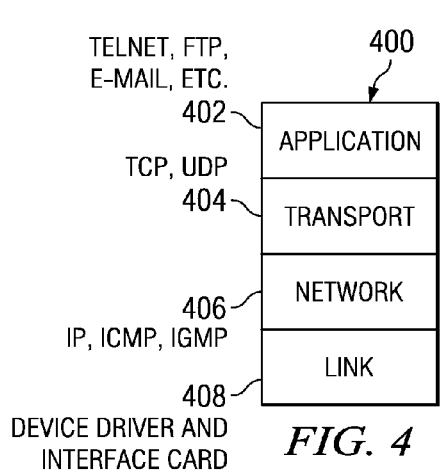
FIG. 4 is a diagram of a transmission control protocol/Internet protocol (TCP/IP) and similar protocols in accordance with an illustrative embodiment.

Turning now to FIG. 4, a diagram of a transmission control protocol/Internet protocol (TCP/IP) and similar protocols is depicted in accordance with an illustrative embodiment. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

In these illustrative examples, the different processes used to determine which security actions have been performed may be implemented in network layer 406. Of course, depending on the particular implementation, higher level layers, such as transport layer 404 and application layer 402 may include these processes. For example, a security protocol like secure sockets layer (SSL) is implemented in application layer 402 in these examples.

Figure 5:
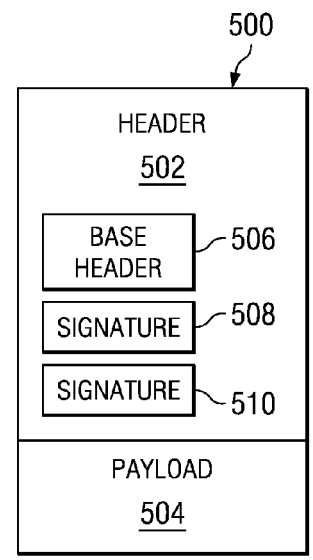
FIG. 5 is a diagram of a data packet in accordance with an illustrative embodiment.

Turning now to FIG. 5, a diagram of a data packet is depicted in accordance with an illustrative embodiment. In this example, data packet 500 includes header 502 and payload 504. Header 502 contains multiple sections or headers. Base header 506 is the first header within header 502. Headers after base header 506 are referred to as extension headers.

In these illustrative examples, a new type of extension header, in the form of a signature header, is added to facilitate identifying security actions that have been taken on a data packet. Base header 506 points to signature 508. In turn, signature 508 points to signature 510. Signature header 510 then points to payload 504. In actual use, in IPv6, data packet 500 will include other extension headers not shown. Data packet 500 may be used to identify signatures, such as signature 508 and signature 510, for use in determining what security actions already have been performed. In this manner, a recipient of data packet 500 may determine what security actions need to be performed based on the security elements placing these signatures into header 502.

Figure 6:
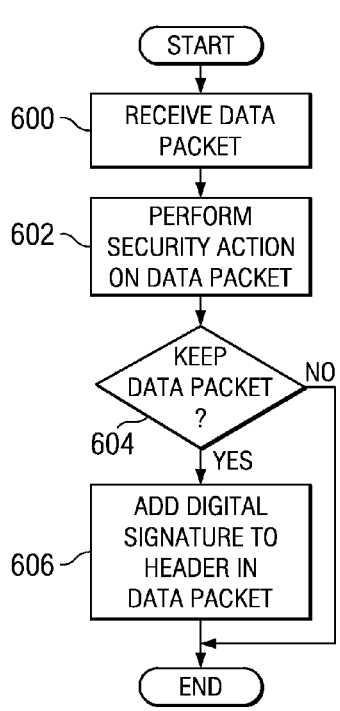
FIG. 6 is a flowchart of a process for determining whether a data packet is from a trusted source in accordance with an illustrative embodiment.

Turning now to FIG. 6, a flowchart of a process for determining whether a data packet is from a trusted source is depicted in accordance with an illustrative embodiment. The process illustrated in FIG. 6 may be implemented in a security element such as firewall 300 in FIG. 3. In particular, the process in FIG. 6 may be implemented in a layer such as network layer 406 in FIG. 4. In this example, the firewall is the first security element in a network to receive a data packet.

The process begins by receiving a data packet (step 600). Thereafter, a security action is performed on the data packet (step 602). In these examples, a security action is a determination as to whether the data packet is from a trusted source. Next, a determination is made as to whether the data packet is to be kept (step 604). The data packet is kept if the data packet originates from a trusted source. If the data packet is kept, a digital signature is then added to the header in the data packet (step 606) with the process terminating thereafter.

With reference to (step 604), if the data packet is not kept, no further action is taken. The process then terminates.

Figure 7:
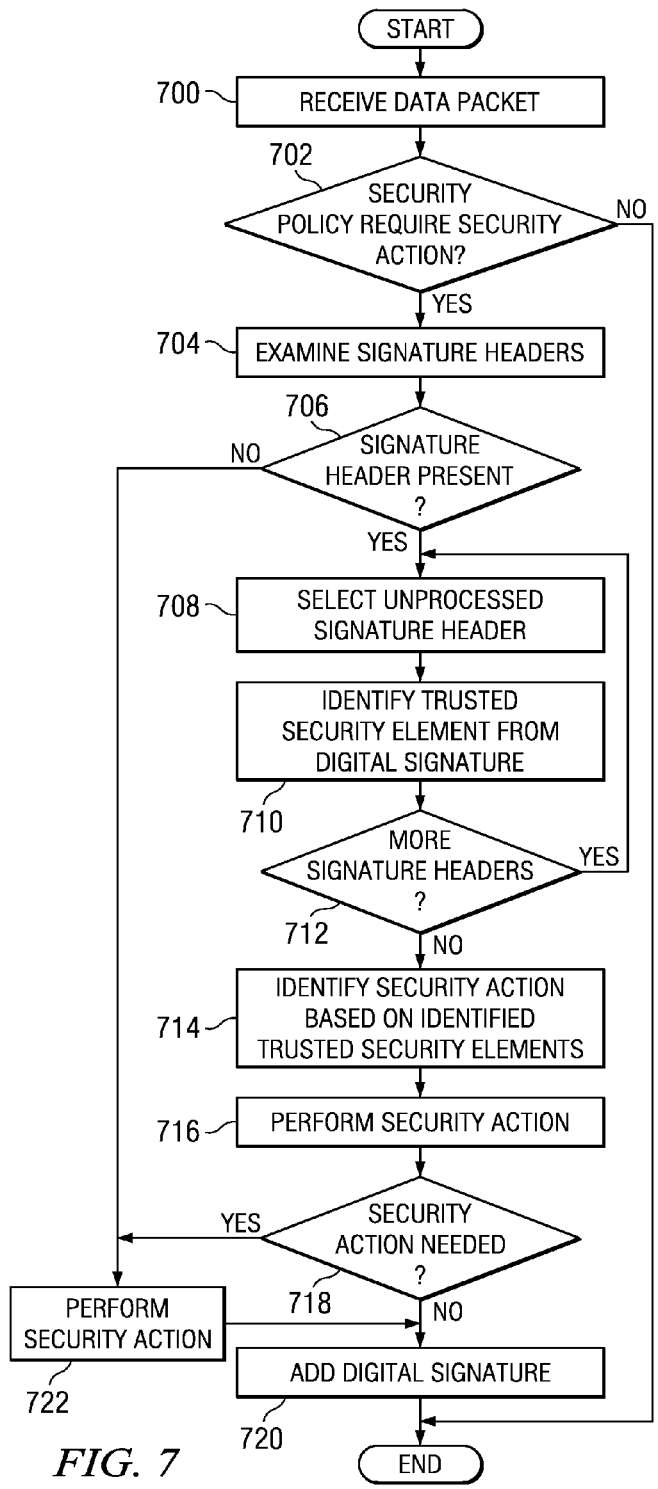
FIG. 7 is a flowchart of a process for performing a security action in accordance with an illustrative embodiment.

Turning now to FIG. 7, a flowchart of a process for performing a security action is depicted in accordance with an illustrative embodiment. The process illustrated in FIG. 7 may be implemented in a security element or some other data processing system within a network. In particular, the process may be implemented in a layer, such as network layer 406 in FIG. 4, in the security element or data processing system.

The process begins by receiving a data packet (step 700). A determination is made as to whether a security policy requires a security action (step 702). In these examples, the security policy is a set of rules used to determine what security action to take. As described above, the security action may be, for example, performing a virus scan, performing a spyware scan, or even taking no action at all. The security policy may be local to the component executing the process. Alternatively, the security policy may be in a remote location, such as security database 308 in FIG. 3.

If the security policy requires a security action, the process examines the extension headers in the data packet (step 704). Thereafter, the determination is made as to whether a signature header is present in the extension header (step 706). If a signature header is present, an unprocessed signature header is selected for processing (step 708). A trusted security element is identified from the digital signature in the signature header (step 710). Then, a determination is made as to whether additional unprocessed signature headers are present (step 712). If additional unprocessed signature headers are present, the process returns to step 708.

Otherwise, a security action is identified based on the identified security elements from the digital signatures (step 714). Thereafter, a security action is performed (step 716). Next, a determination is made as to whether a security action is that no action is needed (step 718). If the process determines there is no security action needed, a digital signature is added for the security element processing the data packet (step 720). The process terminates thereafter. If the process determines the security action is not needed in step 718, the process proceeds to perform the security action (step 722). The process then proceeds to step 720 as described above.

With reference again to the determination made in step 706, if the process determines a signature header is not present, the process proceeds to step 722. Turning back to the determination made in step 702, if the process determines the security policy does not require a security action, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a computer implemented method, apparatus, and computer usable program code for screening data packets. In response to receiving a data packet, a determination is made as to whether a signature of a trusted security element is present in the header of the data packet. This signature indicates that a previous security action has been performed on the data packet. In response to the signature of the trusted security element being present, a security action is then performed in the data packet based on the previous security action.

In this manner, the numbers of security actions performed on a data packet are reduced to eliminate redundant actions in these examples. As a result, the time and performance cost for performing the same security actions on a data packet in different security levels in a network are avoided.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to determine whether one of a first signature, a second signature, and a third signature is present in a header of a data packet, wherein the data packet is configured with a header and a payload, wherein the header further comprises a base header and is configured to receive one or more of the first signature, the second signature, and the third signature, and wherein the first signature indicates a verification that the data packet originated from a trusted source, the second signature indicates that the data packet has been scanned for viruses, and the third signature indicates that the data packet has been scanned for spyware; and
   responsive to an examination of the header of the data packet, only performing the verification that the data packet originated from a trusted source in response to an absence of the first signature, only performing a virus scan in response to an absence of the second signature, and only performing a spyware scan in response to an absence of the third signature.

2. A method comprising:
   determining, by a processor of a computer, whether one of a first signature, a second signature, and a third signature is present in a header of a data packet, wherein the data packet is configured with a header and a payload, wherein the header further comprises a base header and is configured to receive one or more of the first signature, the second signature, and the third signature, and wherein the first signature indicates a verification that the data packet originated from a trusted source, the second signature indicates that the data packet has been scanned for viruses, and the third signature indicates that the data packet has been scanned for spyware;
   responsive to an examination of the header of the data packet by the processor, to only perform the verification that the data packet originated from a trusted source in response to an absence of the first signature, to only perform a virus scan in response to an absence of the second signature, and to only perform a spyware scan in response to an absence of the third signature: and
   configuring the header to receive a fourth signature indicating a scan for worms has been performed, a fifth signature indicating that a scan for trojan horses has been performed, and a sixth signature indicating that a scan for adware has been performed.
   configuring the header to receive a fourth signature indicating a scan for worms has been performed, a fifth signature indicating that a scan for trojan horses has been performed, and a sixth signature indicating that a scan for adware has been performed.

3. The method of claim 2 further comprising:
   configuring each of the first through sixth signatures to identify, by a code in each of the first through sixth signatures, a particular type of mechanism used to perform an action on the data packet as indicated by each of the first through sixth signatures.

4. An apparatus, comprising:
   a bus;
   a communications unit connected to the bus;
   a computer readable storage medium connected to the bus;
   a processor connected to a computer readable memory;
   first program instructions to determine whether one of a first signature, a second signature, and a third signature is present in a header of a data packet, wherein the data packet is configured with a header and a payload, wherein the header further comprises a base header and is configured to receive one or more of the first signature, the second signature, and the third signature, and wherein the first signature indicates a verification that the data packet originated from a trusted source, the second signature indicates that the data packet has been scanned for viruses, and the third signature indicates that the data packet has been scanned for spyware; and
   second program instructions, responsive to an examination of the header of the data packet, to only perform the verification that the data packet originated from a trusted source in response to an absence of the first signature, to only perform a virus scan in response to an absence of the second signature, and to only perform a spyware scan in response to an absence of the third signature;
   wherein the first program instructions and the second program instructions are stored in the computer readable storage medium for running by the processor via the computer readable memory.

5. The apparatus of claim 4 further comprising:
third program instructions to configure the header to receive a fourth signature indicating a scan for worms has been performed, a fifth signature indicating that a scan for trojan horses has been performed, and a sixth signature indicating that a scan for adware has been performed.

6. The apparatus of claim 5 further comprising:
fourth program instructions to configure each of the first through sixth signatures to identify, by a code in each of the first through sixth signatures, a particular type of mechanism used to perform an action on the data packet as indicated by each of the first through sixth signatures.

7. A computer program product, comprising:
a non-transitory computer readable storage medium;
first program instructions to determine whether one of a first signature, a second signature, and a third signature is present in a header of a data packet, wherein the data packet is configured with a header and a payload, wherein the header further comprises a base header and is configured to receive one or more of the first signature, the second signature, and the third signature, and wherein the first signature indicates a verification that the data packet originated from a trusted source, the second signature indicates that the data packet has been scanned for viruses, and the third signature indicates that the data packet has been scanned for spyware; and
second program instructions, responsive to an examination of the header of the data packet, to only perform the verification that the data packet originated from a trusted source in response to an absence of the first signature, to only perform a virus scan in response to an absence of the second signature, and to only perform a spyware scan in response to an absence of the third signature;
wherein the first program instructions and the second program instructions are stored in the non-transitory computer readable storage medium.

* * * * *